United States Patent
Holcomb

(10) Patent No.: US 11,359,461 B2
(45) Date of Patent: Jun. 14, 2022

(54) WELLBORE SYSTEM FOR INTERVENTIONALESS CLEANOUT

(71) Applicant: Ryan Christopher Holcomb, Alpharetta, GA (US)

(72) Inventor: Ryan Christopher Holcomb, Alpharetta, GA (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 7 days.

(21) Appl. No.: 16/705,877

(22) Filed: Dec. 6, 2019

(65) Prior Publication Data

US 2021/0172290 A1 Jun. 10, 2021

(51) Int. Cl.
*E21B 37/04* (2006.01)
*C09K 8/52* (2006.01)

(52) U.S. Cl.
CPC ............ *E21B 37/04* (2013.01); *C09K 8/52* (2013.01)

(58) Field of Classification Search
CPC .......... E21B 37/00; E21B 37/02; E21B 37/04; E21B 37/045; E21B 27/00; E21B 27/005; E21B 27/02; E21B 27/04; E21B 37/08
See application file for complete search history.

(56) References Cited

U.S. PATENT DOCUMENTS

| | | | |
|---|---|---|---|
| 5,228,508 A | 7/1993 | Facteau et al. | |
| 2002/0197174 A1* | 12/2002 | Howard | F04B 47/02 417/417 |
| 2010/0288492 A1 | 11/2010 | Blackman et al. | |
| 2011/0024119 A1* | 2/2011 | Wolf | E21B 37/00 166/301 |
| 2012/0118571 A1* | 5/2012 | Zhou | E21B 27/00 166/301 |
| 2012/0152522 A1 | 6/2012 | Lynde | |
| 2016/0326821 A1 | 11/2016 | Gosselin et al. | |
| 2016/0341026 A1* | 11/2016 | Leitch | E21B 43/121 |
| 2017/0247981 A1 | 8/2017 | Smith et al. | |
| 2018/0238143 A1* | 8/2018 | Falk | E21B 37/00 |
| 2019/0226301 A1* | 7/2019 | Rahman | E21B 37/00 |

OTHER PUBLICATIONS

Notification of Transmittal of The International Search Report and Written Opinion; Application No. PCT/US2020/062676; dated Mar. 11, 2021; 9 pages.

* cited by examiner

*Primary Examiner* — David Carroll
(74) *Attorney, Agent, or Firm* — Cantor Colburn LLP

(57) ABSTRACT

A system and method for cleaning a wellbore. The system includes a production device and a cleaning assembly coupled to a bottom end of the production device. The production device and cleaning assembly are conveyed to a target location in the wellbore. The cleaning assembly is activated to clean the wellbore with the production device disposed at the target location.

14 Claims, 4 Drawing Sheets

WELLBORE SYSTEM FOR INTERVENTIONALESS CLEANOUT

BACKGROUND

In the resource recovery industry, a production string is lowered into a wellbore to a selected downhole location in order to draw hydrocarbons from a formation at the downhole location and deliver the hydrocarbons to a surface location. During production, sand and debris can accumulate in the wellbore, thereby reducing the effectiveness of the production operation. Cleaning the borehole of the sand and debris can increase the production operation back to its initial levels or production. However, a conventional cleaning process requires removing the production string from the wellbore so that a cleaning tool can be lowered into the wellbore. Such a cleaning process can be costly and require effective time and equipment management.

SUMMARY

In one aspect, a method for cleaning a wellbore is disclosed herein. A cleaning assembly is coupled to a production device and the production device and the cleaning assembly are conveyed from a remote location to a target location in the wellbore. The cleaning assembly is activated to clean the wellbore with the production device disposed at the target location.

In another aspect, a system for cleaning a wellbore is disclosed. The system includes a production device conveyable to a target location in the wellbore, and a cleaning assembly coupled to a bottom end of the production device, the cleaning assembly configured to clean the wellbore with the production device disposed at the target location.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
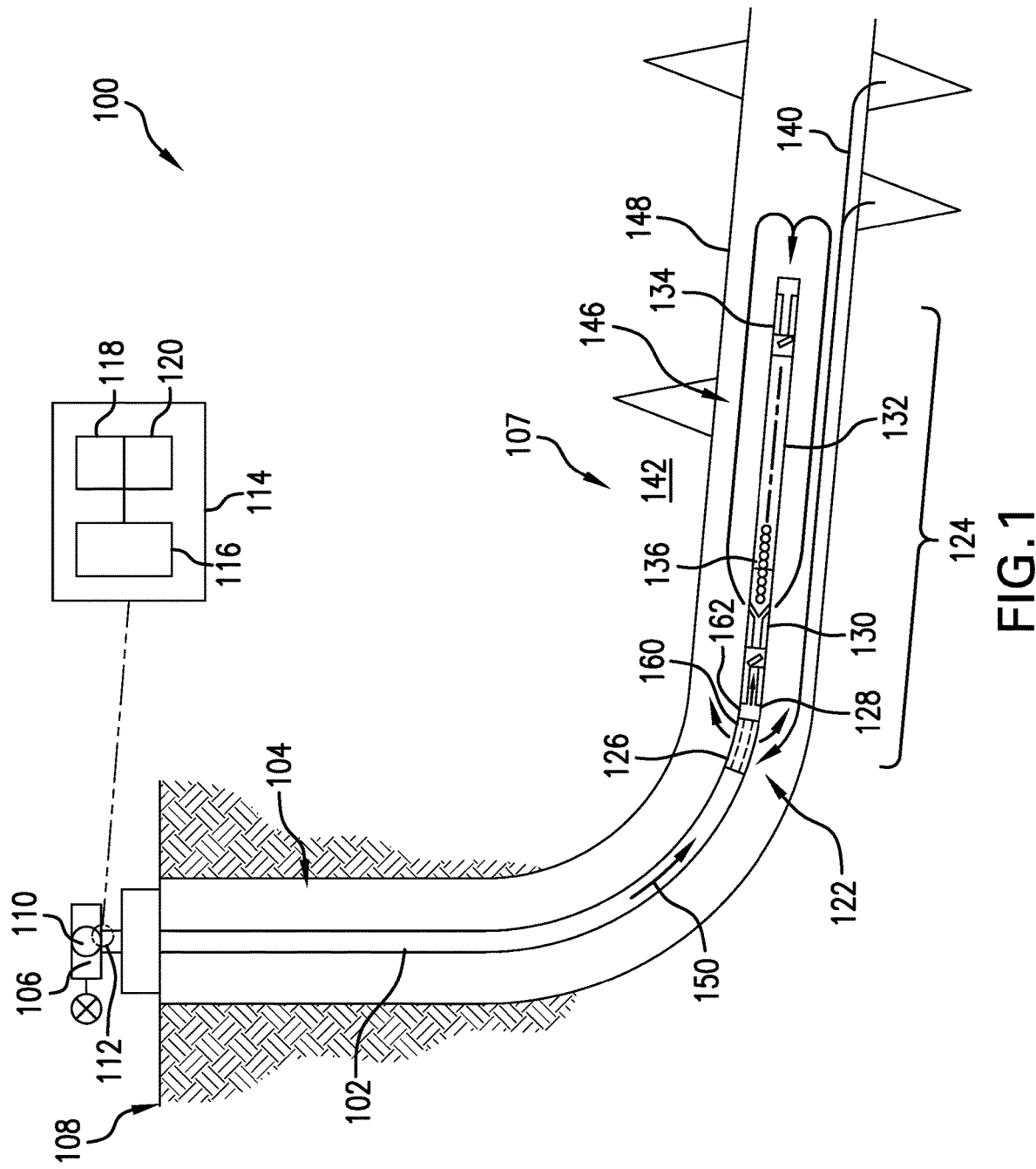
FIG. 1 shows an illustrative production system having the capability of wellbore cleaning in an embodiment.

Referring to FIG. 1, an illustrative production system 100 having the capability of wellbore cleaning is shown in an embodiment. The production system 100 includes a production string 102 that is disposed in a wellbore 104. The production string 102 extends into the wellbore 104 from a production well head or production tree 106 at a remote location 108, which can be a surface location in various embodiments, to a target location 107 in the wellbore 104. The production tree 106 includes a port 110.

A production process can include a production step and a wellbore cleaning step. During the production step, a conduit (not shown) can be attached to the port 110 to receive formation fluid 140 that is retrieved from the wellbore 104 via an interior of the production string 102. During the cleaning step, cleaning equipment (not shown) can be attached to the port 110 to pump a cleaning fluid 150 into the wellbore 104 via the interior of the production string 102. In various embodiments the production tree 106 includes a sensor 112 that measures a production level or volumetric production of formation fluid 140 from the wellbore 104.

A control unit 114 can receive data from the sensor 112 and determine from the production level a time at which to interrupt the production process in order to perform a wellbore cleaning step. The control unit 114 includes a processor 116 and a memory storage device 118 that can include a solid-state memory storage device in various embodiments. The memory storage device 118 has stored therein various instructions or programs 120 that, when accessed by the processor 116, enable the processor 116 to perform various operations disclosed herein. Such operations can include, but are not limited to, determining productions levels for the formation fluid 140, comparing production levels to selected a production threshold, commencing a cleaning step based on the comparison, and performing or controlling various aspects of the cleaning process, as discussed herein.

The production string 102 includes a production device 122 at a bottom end and a cleaning assembly 124 coupled to the production device 122 at a bottom end of the production device 122. In one embodiment, the production device 122 includes a first threaded pipe 160 at its bottom or downhole end and the cleaning assembly 124 includes a second threaded pipe 162 at its top or uphole end. The cleaning assembly 124 is coupled to the production device 122 by threadingly attaching the first threaded pipe 160 to second threaded pipe 162.

In various embodiments, the production device 122 includes a perforated tubing pup or screen 126. The cleaning assembly 124 includes a top float valve 128, a ported jet sub 130, a debris chamber 132 and a bottom float valve 134. The top float valve 128 is at an uphole end of the cleaning assembly 124 and can be coupled to the screen 126 when the production device 122 and the cleaning assembly 124 are coupled to each other. The ported jet sub 130 is disposed between a bottom or downhole end of the top float valve 128 and a top or uphole end of the debris chamber 132. The bottom float valve 134 is affixed to a bottom or downhole end of the debris chamber 132. The debris chamber 132 includes a debris screen 136 that filters debris from a fluid flowing through the debris chamber 132.

During the production step, formation fluid 140 flows into the production string 102 from a target location 107 via the screen 126. The formation fluid 140 flows from the formation 142 and passes through perforations in the screen 126 and passes uphole through the interior of the production string 102. Flow of the formation fluid 140 into the production string 102 produces debris in the wellbore 104 that inhibits or reduces further production of the formation fluid 140. In order to enhance or revive the production levels, the debris is removed from the wellbore 104 using the cleaning assembly 124, as disclosed herein.

To clean debris from the wellbore 104, a cleaning fluid 150 is pumped downhole from the production tree 106 through the interior of the production string 102. A portion of the cleaning fluid 150 passes into the wellbore 104 via the screen 126 while another portion of the cleaning fluid 150 passes into the top float valve 128 and to the ported jet sub 130. The top float valve 128 allows flow of fluid in only one direction (i.e., in a downhole direction) from the screen 126 to the ported jet sub 130. The cleaning fluid 150 passes into the wellbore 104 through ports in the ported jet sub 130 and flows downhole via an annulus 146 between the debris chamber 132 and a wall 148 of the wellbore 104. By circulating through the annulus 146, the cleaning fluid 150 picks up or transports the debris in the wellbore 104 to the bottom float valve 134 at the downhole end of the cleaning assembly 124. At the downhole end, the cleaning fluid 150 and debris are directed into the debris chamber 132 via the bottom float valve 134. The bottom float valve 134 allows flow of fluid into the debris chamber 132 but not out of the debris chamber 132. The cleaning fluid 150 flows through the debris chamber 132 and the debris screen 136 at an uphole end of the debris chamber 132 separates the debris out of the cleaning fluid 150, thereby collecting the debris in the debris chamber 132. The filtered cleaning fluid 150 can be circulated back into the wellbore 104 via the ported jet sub 130. When the debris is cleared from the wellbore 104 to selected level, the production step can be restarted.

Figure 2:
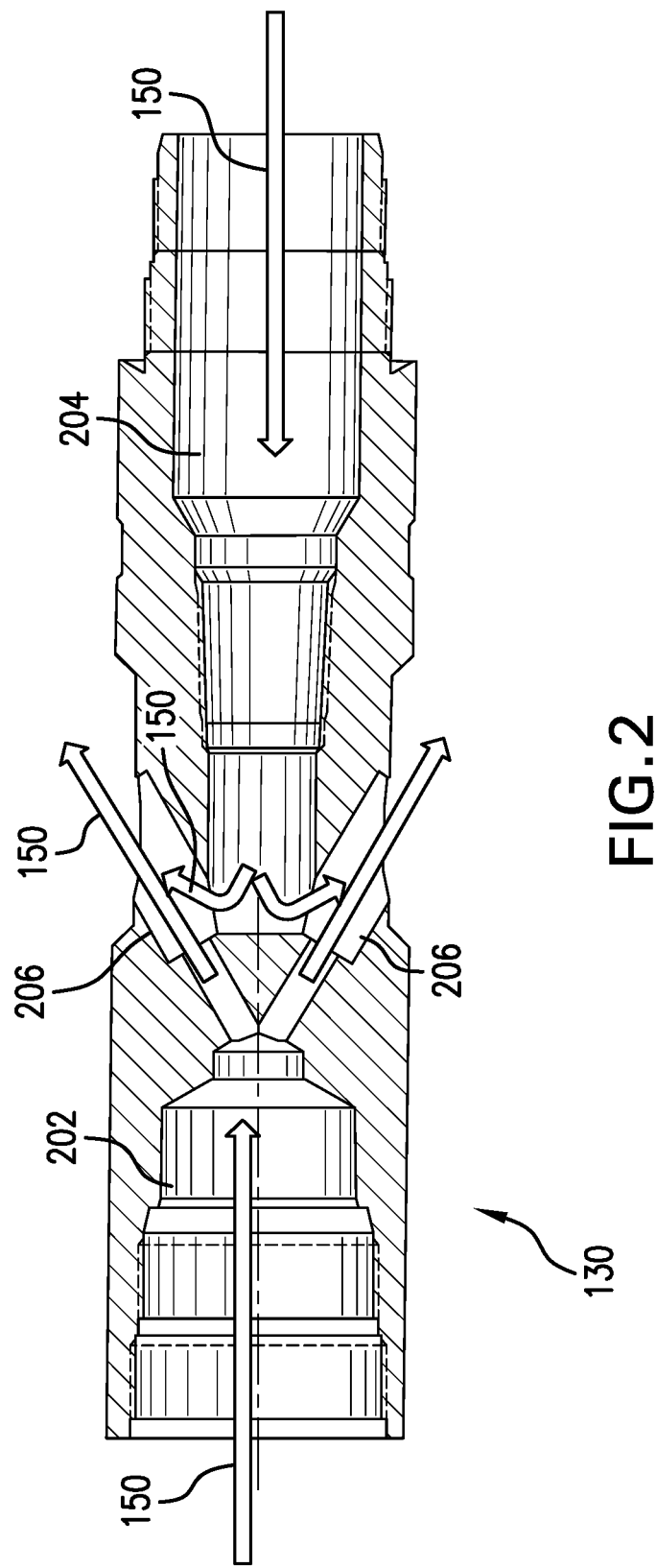
FIG. 2 shows a detailed view of the ported jet sub in an embodiment.

FIG. 2 shows a detailed view of the ported jet sub 130 in an embodiment. The ported jet sub 130 includes a first passage 202 that receives cleaning fluid 150 flowing downhole from the production device 122 and a second passage 204 that receives cleaning fluid 150 flowing uphole from the debris chamber 132. The cleaning fluid 150 from the production device 122 is directed outward via nozzles 206 at high velocity. The velocity of the cleaning fluid 150 in the nozzles 206 creates a suction that pulls the cleaning fluid 150 from the second passage 204 into the nozzles 206 and out into the wellbore 104, thereby circulating the cleaning fluid 150 through the wellbore 104.

Figure 3:
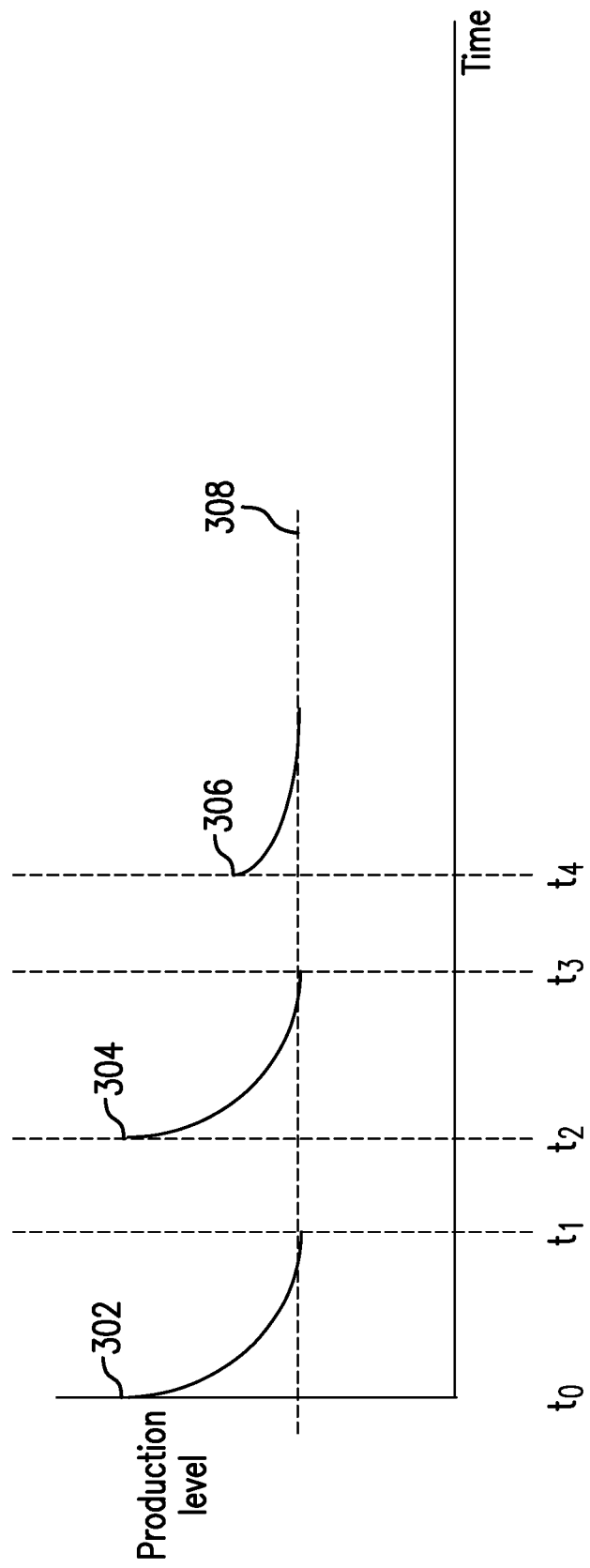
FIG. 3 shows an illustrative production timeline of a production process showing production levels over time.

FIG. 3 shows an illustrative production timeline 300 showing production levels over time. A first production step occurs in the intervals between $t_0$ and $t_1$, a second production step occurs in the interval between $t_2$ and $t_3$, and a third production step occurs in the interval after time $t_4$, a first cleaning step occurs in the interval between $t_1$ and $t_2$, and a second cleaning step occurs in the interval between $t_3$ and $t_4$. The first production step has a first initial production level 302, the second production step has a second initial production level 304 and the third production step has a third initial production level 306. The production levels decrease over time due, in part, to the accumulation of debris in the wellbore. When the production level of the first production step falls below a selected production threshold 308, the first production step is ended and the first cleaning step is performed using the methods disclosed herein to remove the debris. After the first cleaning step is completed, the second production step can be commenced.

The second initial production level 304 of the second production step can be the same as or less than the first initial production level 302 due to the natural depletion of formation fluid 140 from the formation 142. When the production level of the second production step falls below the selected production threshold 308, the second production step is ended and the second cleaning step is performed using the methods disclosed herein. For purposes of illustration, the second cleaning step is unable to sufficiently remove debris from the wellbore. Typically, this occurs when the debris chamber 132 of the cleaning assembly 124 is full and/or can no longer accept debris. As a result, the third initial production level 306 is significantly less than the second initial production level 304. Therefore, a measurement of the production levels, and in particular to the initial production levels, using the sensor 112 and the control unit 114 can be used to determine when the debris chamber 132 is full and needs to be emptied out.

When the debris chamber 132 is full, the entire production string 102 can be retrieved to the remote location 108 for recycling. In the recycling process, the debris can be removed from the debris chamber 132. Alternatively, the debris chamber 132 can be removed from the cleaning assembly 124 and replaced by another debris chamber 132. Upon being recycled, the cleaning assembly 124 can be lowered back into the wellbore 104 at the bottom end of the production device 122.

Figure 4:
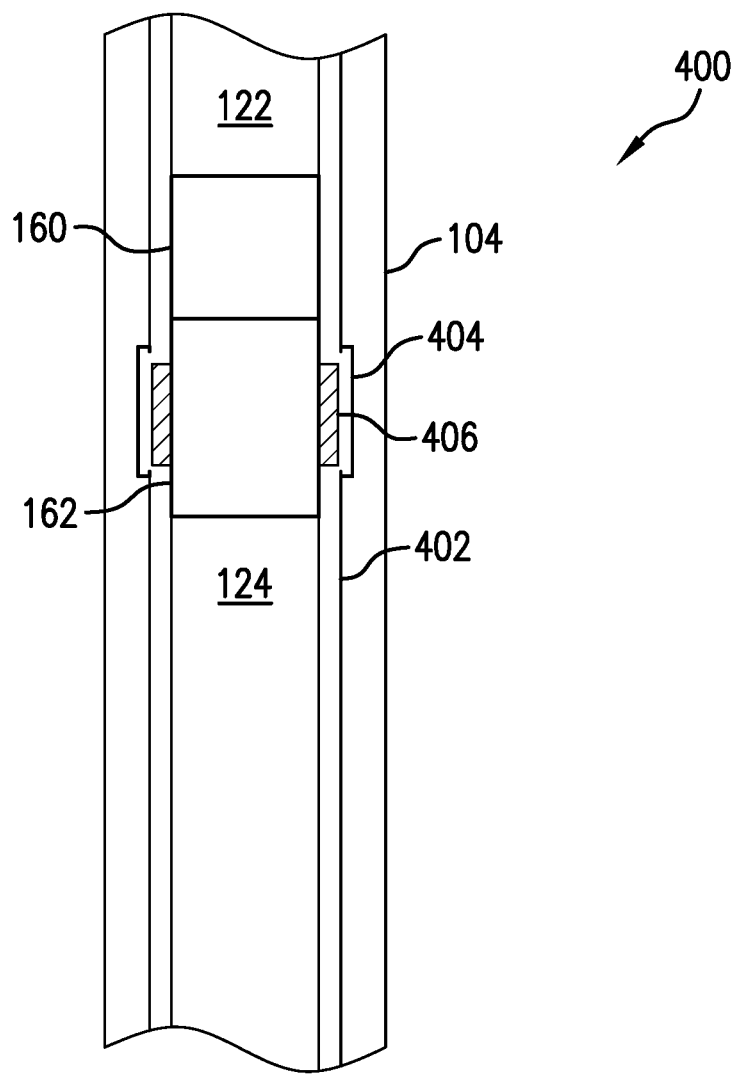
FIG. 4 shows a storage section of the wellbore in an alternate embodiment of the production system of FIG. 1.

FIG. 4 shows a cleaning assembly storage section 400 of the wellbore 104 in an alternate embodiment of the production system 100 of FIG. 1. The wellbore 104 includes a casing 402 or other structure that includes a recess or profile 404 at a selected location of the casing 402. The cleaning assembly 124 includes a collet 406 or expandable member that is biased radially outward from the cleaning assembly 124. When the collet 406 reaches the depth of the profile 404, it expands radially outward to settle into the profile 404. The production device 122 can then be detached from the cleaning assembly 124 and withdrawn uphole, leaving the cleaning assembly 124 at the cleaning assembly storage section 400 of the wellbore 104. The production device 122 (or another production device) can later be lowered into the wellbore 104 to the location of the cleaning assembly 124 and then coupled to the cleaning assembly 124 being supported by the profile 404. Once the production device 122 and cleaning assembly 124 have been coupled together, the cleaning assembly 124 can be conveyed downhole by the production device 122 to the target location 107 or other suitable downhole location. The collet 406 can retract radially from the profile 404, thereby releasing the cleaning assembly 124 from the profile 404 and allowing the cleaning assembly 124 to be moved downhole. The collet 406 can be retracted either via a mechanical actuator or by application of a sufficient downward force on the production device 122.

Set forth below are some embodiments of the foregoing disclosure:

Embodiment 1

A method for cleaning a wellbore, including coupling a cleaning assembly to a production device; conveying the production device and the cleaning assembly from a remote location to a target location in the wellbore; and activating the cleaning assembly to clean the wellbore with the production device disposed at the target location.

Embodiment 2

The method according to any prior embodiment, further including coupling the cleaning assembly to the production device by coupling a first threaded pipe of the production device to a second threaded pipe of the cleaning assembly.

Embodiment 3

The method according to any prior embodiment, further including transporting debris from the wellbore into a debris chamber of the cleaning assembly by circulating a cleaning fluid in the wellbore.

Embodiment 4

The method according to any prior embodiment, further including determining an amount of the debris in the debris chamber by observing an initial production level of a formation fluid in the production device.

Embodiment 5

The method according to any prior embodiment, further including removing the production device and the cleaning assembly to the remote location, recycling the cleaning assembly, and conveying the production device and the cleaning assembly to a downhole location.

Embodiment 6

The method according to any prior embodiment, wherein recycling the cleaning assembly includes one of: (i) emptying a debris chamber of the cleaning assembly; and (ii) replacing the debris chamber.

Embodiment 7

The method according to any prior embodiment, further including coupling a pump at the remote location to a production string that includes the production device in order to activate the cleaning assembly.

Embodiment 8

The method according to any prior embodiment, further including retrieving the production device from the wellbore while leaving the cleaning assembly at a storage location in the wellbore.

Embodiment 9

A system for cleaning a wellbore, comprising: a production device conveyable to a target location in the wellbore; and a cleaning assembly coupled to a bottom end of the production device, the cleaning assembly configured to clean the wellbore with the production device disposed at the target location.

Embodiment 10

The system according to any prior embodiment, wherein the production device includes a first threaded pipe and the cleaning assembly includes a second threaded pipe configured to threadingly couple to the first threaded pipe.

Embodiment 11

The system according to any prior embodiment, further including a sensor configured to measure a production level of formation fluid from the wellbore and a processor configured to determine a volume of debris in a debris chamber of the cleaning assembly from the production level.

Embodiment 12

The system according to any prior embodiment, wherein the cleaning assembly is configured to be removed from the wellbore to a remote location via the production device, recycled at the remote location and redeployed into the wellbore via the production device.

Embodiment 13

The system according to any prior embodiment, wherein the cleaning assembly includes a debris chamber that can be one of: (i) emptied out at the remote location; and (ii) replaced at the remote location.

Embodiment 14

The system according to any prior embodiment, further including a pump attachable at a remote location to a production string that includes the production device in order to activate the cleaning assembly to clean the wellbore.

Embodiment 15

The system according to any prior embodiment, wherein the cleaning assembly further comprises an expandable member configured to support the cleaning assembly at a storage location in the wellbore.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:
1. A method for cleaning a wellbore, comprising:
coupling a cleaning assembly to a bottom end of a production string;

conveying the cleaning assembly via the production string from a remote location to a target location in the wellbore;

activating the cleaning assembly at the target location to circulate a cleaning fluid in an annulus between the cleaning assembly and a wall of the wellbore to transport debris from the wellbore into the cleaning assembly at a bottom end of the cleaning assembly; and retrieving the production string from the wellbore while leaving the cleaning assembly at a storage location in the wellbore.

2. The method of claim 1, further comprising coupling the cleaning assembly to the production string by coupling a first threaded pipe of a production device at a bottom end of the production string to a second threaded pipe of the cleaning assembly.

3. The method of claim 1, further comprising transporting debris from the wellbore into a debris chamber of the cleaning assembly by circulating the cleaning fluid from the annulus into the bottom end of the debris chamber.

4. The method of claim 3, further comprising determining the debris chamber to be full by observing an initial production level of a formation fluid in the production device for a production step following a cleaning step to an initial production level of the formation fluid for the production step preceding the cleaning step.

5. The method of claim 1, further comprising removing the production string and the cleaning assembly to the remote location, recycling the cleaning assembly, and conveying the production string and the cleaning assembly to a downhole location.

6. The method of claim 5, wherein recycling the cleaning assembly includes one of: (i) emptying a debris chamber of the cleaning assembly; and (ii) replacing the debris chamber.

7. The method of claim 1, wherein coupling the cleaning assembly to the production string further comprises disposing a jet sub between the cleaning assembly and the production string, further comprising directing the cleaning fluid into the annulus at the target location via the jet sub.

8. A system for cleaning a wellbore, comprising:
a production string conveyable to a target location in the wellbore; and
a cleaning assembly coupled to a bottom end of the production string, the cleaning assembly configured to clean the wellbore at the target location by circulating a cleaning fluid in an annulus between the cleaning assembly and a wall of the wellbore to transport debris from the wellbore into the cleaning assembly at a bottom end of the cleaning assembly, wherein the production string in retrievable from the wellbore while leaving the cleaning assembly at a storage location in the wellbore.

9. The system of claim 8, wherein the production string includes a first threaded pipe and the cleaning assembly includes a second threaded pipe configured to threadingly couple to the first threaded pipe.

10. The system of claim 8, further comprising a sensor configured to measure a production level of formation fluid from the wellbore and a processor configured to determine a volume of debris in a debris chamber of the cleaning assembly from the production level.

11. The system of claim 8, wherein the cleaning assembly is configured to be removed from the wellbore to a remote location via the production string, recycled at the remote location and redeployed into the wellbore via the production string.

12. The system of claim 11, wherein the cleaning assembly includes a debris chamber that can be one of: (i) emptied out at the remote location; and (ii) replaced at the remote location.

13. The system of claim 8, further comprising a jet sub disposed between the production string and the cleaning assembly, wherein jet sub directs the cleaning fluid into the annulus at an uphole end of the cleaning assembly.

14. The system of claim 8, wherein the cleaning assembly further comprises an expandable member configured to support the cleaning assembly at a storage location in the wellbore.

\* \* \* \* \*